US006139058A

United States Patent [19]
Böhmler

[11] Patent Number: 6,139,058
[45] Date of Patent: Oct. 31, 2000

[54] BELT TENSIONER FOR AN OCCUPANT RESTRAINT SYSTEM

[75] Inventor: Klaus Böhmler, Schwäbisch Gmünd, Germany

[73] Assignee: TRW Occupant Restraint Systems GmbH & Co. KG, Alfdorf, Germany

[21] Appl. No.: 09/096,312

[22] Filed: Jun. 11, 1998

[30] Foreign Application Priority Data

Jun. 12, 1997 [DE] Germany ............... 297 10 325 U

[51] Int. Cl.⁷ ............................................. B60R 22/195
[52] U.S. Cl. ........................ 280/806; 297/480; 60/632
[58] Field of Search ...................... 280/806; 297/480; 60/632, 635

[56] References Cited

U.S. PATENT DOCUMENTS

| | | |
|---|---|---|
| 3,982,775 | 9/1976 | Lindblad . |
| 4,015,860 | 4/1977 | Tisell et al. . |
| 4,232,886 | 11/1980 | Tsuge et al. . |
| 4,485,985 | 12/1984 | Fohl ................................ 280/806 |
| 5,845,939 | 12/1998 | Greiner et al. ................. 280/806 |

FOREIGN PATENT DOCUMENTS

| | | |
|---|---|---|
| 2169381 | 9/1973 | France . |
| 2286730 | 4/1976 | France . |
| 2726096 | 12/1978 | Germany . |
| 38 29 694 | 3/1990 | Germany ................ 280/806 |
| 3-292239 | 12/1991 | Japan .................... 280/806 |
| 3-295740 | 12/1991 | Japan .................... 280/806 |
| 6-72289 | 2/1994 | Japan .................... 280/806 |
| 1800770 | 1/1994 | U.S.S.R. ................ 280/806 |

*Primary Examiner*—Peter C. English
*Attorney, Agent, or Firm*—Tarolli, Sundheim, Covell, Tummino & Szabo L.L.P.

[57] ABSTRACT

A compact belt tensioner for use in an occupant restraint system near an end of the webbing fixed to the vehicle body is disclosed. A piston/cylinder linear drive has a pair of opposed pistons and an expansion chamber with a pyrotechnic charge between the pistons. Each piston has an outer end shaped as a webbing engagement member. The belt webbing is looped around the engagement members between the fixed end of the belt and a deflector element mounted on the vehicle body. When the pyrotechnic charge is activated the pistons are driven outwardly, forming a belt loop the length of which is four times the piston stroke.

3 Claims, 1 Drawing Sheet

BELT TENSIONER FOR AN OCCUPANT RESTRAINT SYSTEM

BACKGROUND OF THE INVENTION

The present invention relates to a belt tensioner in an occupant restraint system which has a safety belt one end of which is anchored to the vehicle body.

Such belt tensioners usually comprise a piston/cylinder linear drive which has a pyrotechnic propellant charge. One of the known types of belt tensioners (DE 30 44 951 A1) engages directly on the belt webbing, in order to form a belt webbing loop due to which the effective belt webbing length is reduced. The belt webbing loop is formed between a pair of deflector elements mounted on the vehicle body.

SUMMARY OF THE INVENTION

The invention provides a belt tensioner which, for a given amount of effective belt webbing length reduction, is distinguished by a very compact design, by a high operating speed and by a reduced number of components. The belt tensioner according to the invention comprises a piston/cylinder linear drive with a pyrotechnic propellant charge. The piston/cylinder linear drive comprises a piston, the end face of which forms an engagement element for the belt webbing. This engagement element is looped around by the belt webbing between a vehicle-fixed deflector element and the end of the belt webbing which is anchored to the vehicle body. In addition to its terminal fastening on the vehicle body, the belt webbing thus forms a loop in accordance with the shape of the engagement element on the end face of the piston. On activation of the belt tensioner, the piston is pushed out from the cylinder by the ignited propellant charge, the belt webbing loop enlarging at the same time. The enlargement of the belt webbing loop results in a retraction of the belt webbing, the length of the retracted belt webbing being twice as great as that of the piston stroke.

In the preferred embodiment, the piston/cylinder linear drive comprises a cylinder with two pistons arranged therein lying opposite each other, between which an expansion chamber is formed. Each piston is provided with an engagement element on its outward end face and both engagement elements are looped around by the belt webbing between a vehicle-fixed deflector element and the end of the belt webbing which is anchored to the vehicle body. In this embodiment, the length of the retracted belt webbing is equal to twice the value of the sum of both piston strokes, or equal to four times a single piston stroke. Due to the symmetrical construction of the piston/cylinder linear drive, the forces occurring on activation of the propellant charge act in axial directions which are opposed to each other, so that any reaction forces balance each other.

Basically two solutions are provided, in order to secure the retracted belt webbing length after the belt tensioning has been completed: According to a first approach, the belt webbing is clamped by means of a belt clamp which has, for example, an eccentrically mounted roller; according to a second approach, the piston or each of the pistons is provided with a return stop which prevents its return movement in the cylinder.

Owing to its compact structure, the belt tensioner according to the invention is also suitable for use in limited space conditions, in particular on an end fitting on a rear seat of the vehicle.

BRIEF DESCRIPTION OF THE DRAWINGS

Further features and advantages of the invention read from the following description of two embodiments and from the drawing to which reference is made. In the drawing.

DESCRIPTION OF PREFERRED EMBODIMENTS

Figure 1:
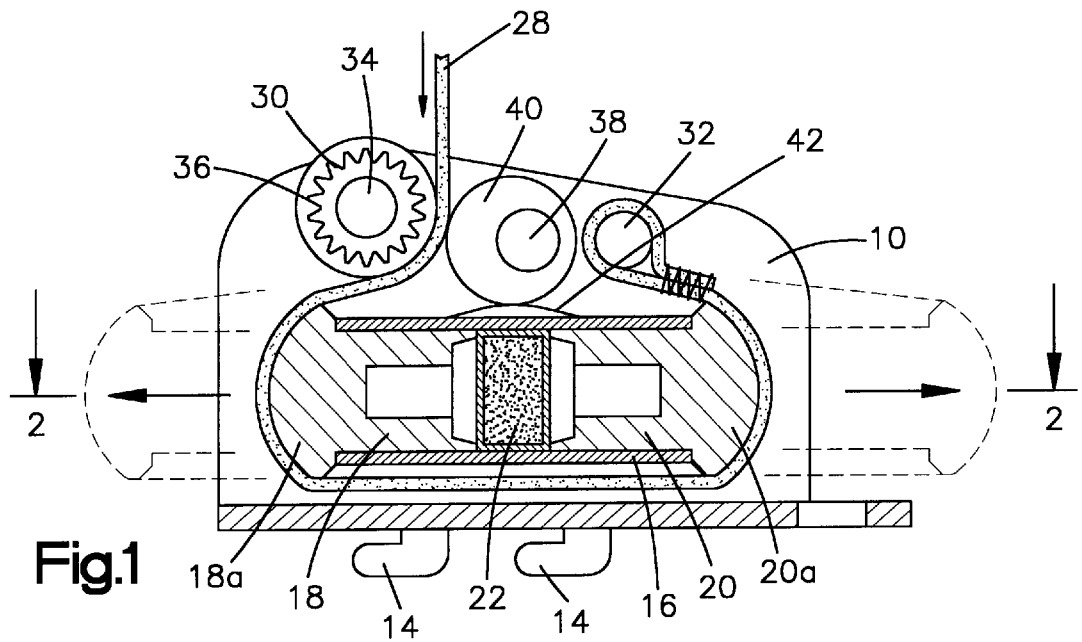
FIG. 1 shows a first embodiment of the belt tensioner in axial section through a piston/cylinder linear drive.
Figure 2:
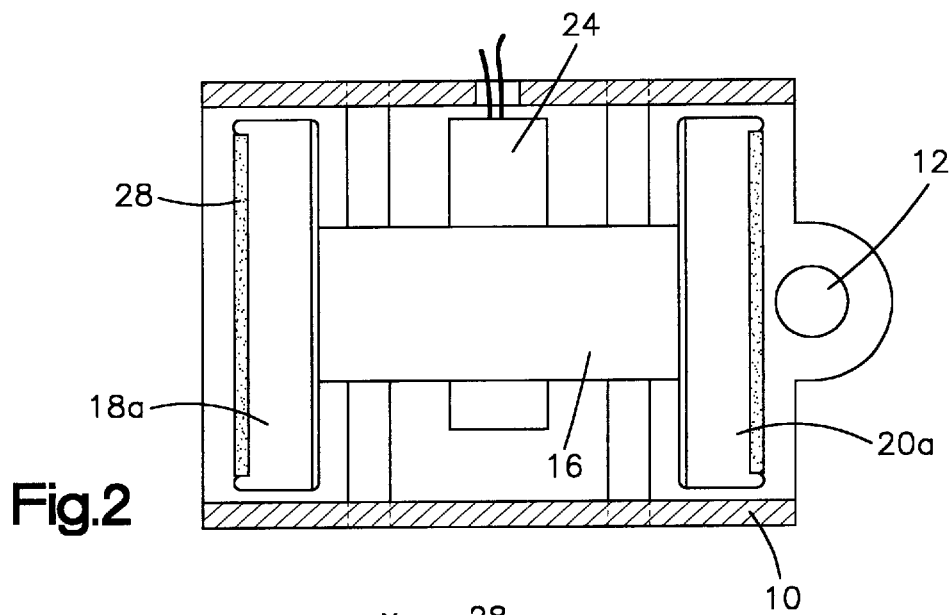
FIG. 2 shows a view, partially in section, according to line 2—2 in FIG. 1.

The belt tensioner shown in FIGS. 1 and 2 comprises as load-bearing component a frame 10, U-shaped in cross-section, the base of which is secured to the vehicle body with a lug 12 and several hooks 14 protruding from the frame. A cylinder 16 is secured in the frame 10 with the axis of the cylinder 16 parallel to the base of the frame. A piston 18, 20 is movably inserted into each end of the cylinder 16. The space remaining between the inward ends of the pistons 18, 20 in the cylinder 16 forms an expansion chamber in which a pyrotechnic propellant charge 22 is arranged. Axial bores on the inner ends of the pistons 18,20 constitute part of this expansion chamber. An ignition device 24 arranged externally on the cylinder 16 communicates with the expansion chamber inside the cylinder via a bore (not shown) in the cylinder wall.

A deflector member 18a or 20a is formed on the end face of each piston 18, 20. These deflector members 18a, 20a together with the entire cylinder 16 are looped around by a belt webbing section 28. This belt webbing section 28 runs over a deflector roller 30 rotatably mounted in the frame 10, then over the deflector member 18a, along the outer wall of the cylinder 16, then over the deflector member 20a and finally to a pin 32 held between the legs of the frame 10, on which pin 32 the end of the belt webbing section 28 is anchored by means of a loop. The deflector roller 30 is rotatably mounted on a bearing pin 34, which is held between the legs of the frame 10. The deflector roller 30 is provided with a sleeve 36 which is frictionally mounted on its periphery.

A clamping roller 40 which is rotatably mounted eccentrically on a bearing pin 38 cooperates with the deflector roller 30 as a return stop. The belt webbing section 28 runs through between the deflector roller 30 and the clamping roller 40. The clamping roller 40 is pressed into contact against the belt webbing by an arched plate spring 42 which is supported on the outer side of the cylinder 16.

To activate the belt tensioner, the igniter 24 is triggered (electrically, for example), which then in turn activates the propellant charge 22 through the opening (not shown) in the cylinder wall. By the extremely high pressure now building up in the expansion chamber between the pistons 18, 20, the pistons 18, 20 are driven apart and reach their final position which is illustrated in dotted lines in FIG. 1. As a result of this, the belt webbing loop which is placed around the pistons is correspondingly enlarged, so that a belt webbing length is retracted corresponding to twice the value of the sum of the two piston strokes or four times the value of one piston stroke. It can be seen that with a small piston stroke a great length of belt webbing can be retracted.

The retracting of the belt webbing is not impeded in this process by the clamping roller 40, because its periphery moves away from the belt webbing in an anticlockwise direction on rotation. If, after the belt webbing tensioning has been completed, the direction of movement of the belt webbing is reversed by the load occurring in the belt webbing system, then the clamping roller 40 turns in a clockwise direction, whereby its clamping function is activated.

Only with a very high load does the sleeve 36 slip on the periphery of the deflector roller 30, whereby a force limitation occurs with a predetermined force profile.

Figure 3:
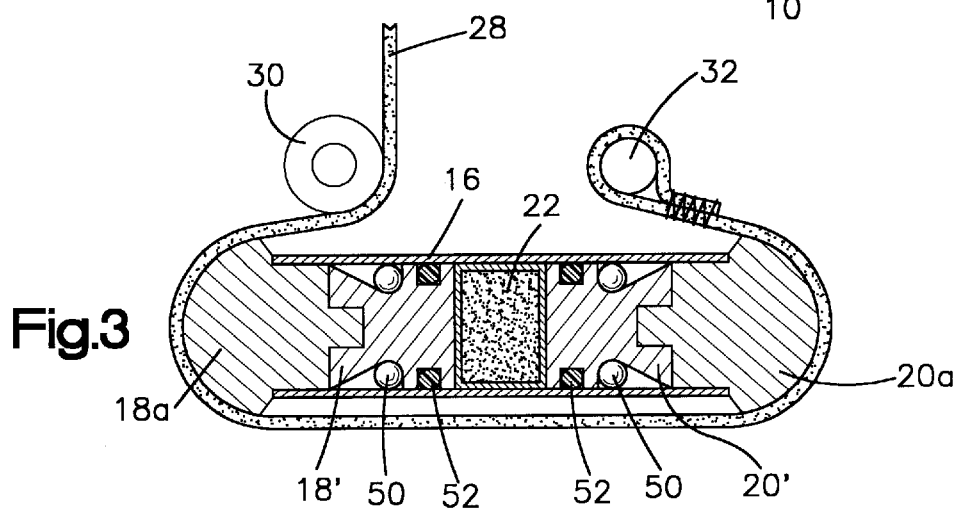
FIG. 3 shows an axial section of a second embodiment of the belt tensioner.

In the embodiment of the belt tensioner shown diagrammatically in FIG. 3, the piston/cylinder linear drive in the cylinder 16 comprises two pistons 18', 20' which as in the previously described embodiment are provided with deflector members 18a, 20a on the outward end faces. Here, also, the belt webbing section 28 is guided over a deflector roller 30. Instead of a clamping roller, however, a clamping locking mechanism is provided in the cylinder 16, which consists of several clamping balls 50 in a surrounding groove on the periphery of each piston 18', 20' with a ramp-shaped base. In addition, the pistons 18', 20' in the cylinders 16 are sealed by means of one O-ring seal 52 each.

What is claimed is:

1. A belt tensioner in a vehicle occupant restraint system comprising a safety belt, said safety belt having an end anchored to a vehicle body, a piston/cylinder linear drive which has a cylinder, a pair of axially opposed pistons accommodated in opposed ends of said cylinder, an expansion chamber within said cylinder between said pistons, and a pyrotechnic propellant charge, and further comprising a deflector element fixedly mounted with respect to said vehicle body, each piston carrying an engagement element on an outward end face thereof and both engagement elements being looped around by said belt between the deflector element and the end of the belt which is anchored to the vehicle body, wherein the belt is guided between the deflector element and a clamping roller mounted opposite to said deflector element, the clamping roller being mounted rotatably and being movable towards the belt.

2. The belt tensioner according to claim 1, wherein the clamping roller is eccentrically mounted on a bearing pin.

3. The belt tensioner according to claim 2, wherein the clamping roller is resiliently held in contact against the belt.

* * * * *